(12) United States Patent
Bresciani et al.

(10) Patent No.: US 8,607,690 B1
(45) Date of Patent: Dec. 17, 2013

(54) COFFEE BREWING APPARATUS

(75) Inventors: Roberto Bresciani, Ferndale, WA (US); Luciano Angeletti, Belforte D.Chienti (IT)

(73) Assignee: Wholesale Manufacturer Representatives Inc., Ferndale, WA (US)

( * ) Notice: Subject to any disclaimer, the term of this patent is extended or adjusted under 35 U.S.C. 154(b) by 434 days.

(21) Appl. No.: 12/793,055

(22) Filed: Jun. 3, 2010

(51) Int. Cl.
  *A47J 31/00* (2006.01)
(52) U.S. Cl.
  USPC .................. 99/281; 99/295; 99/299; 99/300; 99/302 R; 99/279
(58) Field of Classification Search
  USPC ................ 99/281, 295, 299, 300, 302 R, 279
  See application file for complete search history.

(56) References Cited

U.S. PATENT DOCUMENTS

| | | | | |
|---|---|---|---|---|
| 3,314,357 A | * | 4/1967 | Valente | 99/282 |
| 3,364,842 A | * | 1/1968 | Valente | 99/298 |
| 4,757,753 A | * | 7/1988 | Pandolfi | 99/290 |
| 4,941,399 A | * | 7/1990 | Zucchetti | 99/289 P |
| 5,551,331 A | * | 9/1996 | Pfeifer et al. | 99/280 |
| 5,613,422 A | * | 3/1997 | Giuliano | 99/281 |
| 2003/0155101 A1 | * | 8/2003 | Minney | 165/58 |
| 2008/0017041 A1 | * | 1/2008 | Beretta | 99/279 |
| 2009/0092728 A1 | * | 4/2009 | Coccia et al. | 426/569 |
| 2009/0101019 A1 | * | 4/2009 | Coccia | 99/280 |
| 2010/0018404 A1 | * | 1/2010 | Villa et al. | 99/288 |
| 2010/0018407 A1 | * | 1/2010 | Liu | 99/302 R |
| 2010/0080886 A1 | * | 4/2010 | Hourizadeh | 426/595 |
| 2011/0113970 A1 | * | 5/2011 | Liu | 99/300 |

FOREIGN PATENT DOCUMENTS

| | | | |
|---|---|---|---|
| EP | 73496 | * | 3/1983 |
| EP | 201656 | * | 11/1986 |
| WO | WO 2010001146 | * | 1/2010 |

* cited by examiner

*Primary Examiner* — Anthony Weier
(74) *Attorney, Agent, or Firm* — Forrest Law Office, P.C.

(57) ABSTRACT

A system and method for brewing coffee to produce elevated levels of niacinamide is shown. One embodiment includes providing a dark roasted coffee, brewing the coffee at pressures above atmospheric pressure in water heated above boiling temperature, and producing a brewed coffee with elevated levels of niacinamide. Another embodiment includes a system comprising a boiler with a heating element, a heat exchanger extending into the boiler, the heat exchanger having an injector with at least one lateral opening to inject water laterally into the heat exchanger, to produce pressurized water above atmospheric boiling temperature to brew ground coffee at temperatures above boiling to produce a coffee with elevated levels of niacinamide. The embodiment system may also include a thermally insulating lid.

8 Claims, 6 Drawing Sheets

Analytical Results Sheet

| Lot Number | 102 | 201 | 202 | 203 | 301 | 302 | 303 | 401 | 402 | 501 | 502 | 601 | 602 |
|---|---|---|---|---|---|---|---|---|---|---|---|---|---|
| Sample Name | Store | D2134 | D2234 | D2334 | D3134 | D3234 | D3334 | D3327 | D3350 | L3331 | L2030 | D3419 | D3428 |
| Measurement | mg/oz | mg/oz | mg/oz | mg/oz | mg/oz | mg/oz | mg/oz | mg/oz | mg/oz | mg/oz | mg/oz | mg/oz | mg/oz |
| Theobromine | 0.28 | 0.53 | 0.45 | 0.53 | 0.63 | -- | 0.72 | 0.17 | 0.12 | 0.2 | 0.12 | .57 | .65 |
| Theophylline | 0.15 | 0.25 | 0.20 | 0.25 | 0.26 | -- | 0.27 | 0.22 | 0.25 | 0.23 | 0.097 | .37 | .43 |
| Epigallocatechin (EGC) | 5.05 | 10.25 | 8.55 | 10.55 | 11.70 | -- | 12.57 | 10.4 | 11.3 | 14.8 | 11.4 | 8.7 | 12 |
| Catechin | 1.78 | 3.41 | 3.10 | 3.65 | 4.40 | -- | 4.57 | 3.89 | 4.4 | 11.3 | 8.76 | 4.2 | 5.4 |
| Caffeine | 69.50 | 131.5 | 126.00 | 136.50 | 160.33 | -- | 174.67 | 168 | 170 | 180 | 134 | 173 | 189 |
| Epicatechin | 0.82 | 1.73 | 1.26 | 1.09 | 1.72 | -- | 1.93 | 2.65 | 2.23 | 2.64 | 1.65 | .86 | .93 |
| Epigallocatechin Gallata (CGCG) | 0.59 | 1.48 | 1.19 | 1.32 | 1.76 | -- | 1.90 | 2.63 | 2.04 | 2.46 | 1.46 | 1.4 | 1.4 |
| Epicatechin Gallate (ECG) | 0.40 | 0.47 | 0.54 | 0.48 | 0.64 | -- | 0.59 | 1.18 | 0.3 | 0.84 | 0.15 | 1.3 | 1.2 |
| Total Theaflavins | 0.00 | 0.00 | 0.00 | 0.00 | 0.00 | -- | 0.00 | 1.38 | 4.25 | 3.2 | .28 | 2.7 | 3.2 |
| Niacin | -- | -- | -- | -- | -- | -- | -- | 10.2 | 10.1 | 10.1 | 9.91 | 7.2 | 7.2 |
| Niacinamide | 15.30 | 22.55 | 24.7 | 27.00 | 31.60 | 34.00 | -- | 40.3 | 39.5 | 22.2 | 16.2 | 33.1 | 35.5 |

FIG. 3

COFFEE BREWING APPARATUS

BACKGROUND

The disclosed embodiments generally relate to beverages with enhanced flavor and energizing effects, and methods and apparatuses for making the same.

The energizing effects of the caffeine in coffee and the pleasures associated with drinking coffee are well documented. Coffee has been cultivated, roasted and then brewed for centuries. Coffee beans vary considerably based on climate conditions, soil composition, sunlight, farming practices, moisture content, etc. Green coffee beans (unroasted) are typically grown in three varieties, including arabica, robusta, and liberica beans. Arabica beans are grown at higher elevations and typically ripen more slowly and have higher lipid content and a lower chlorogenic acid and caffeine content than Robusta beans, and are generally considered the higher quality beans for making coffee.

To increase coffee extraction and develop aroma and flavor in brewed coffee, green coffee beans are roasted. Roasting also creates considerable chemical changes in coffee beans. These changes can vary significantly based on roasting time and the degree of roasting, that is, the color of the resulting roasted coffee beans. Roasting also changes the flavors that may be derived from brewed coffee. For example, aromatic oils, acids, and caffeine content are decreased; while at certain temperatures other oils such as caffeol develop, increasing coffee's aroma and flavor. Darker roasts typically create smoother and robust coffees and lighter roasts typically have stronger and brighter flavors from higher acid and aromatic oil content due to a milder roasting.

Roasted coffee beans are then typically ground and brewed to create a beverage. The three most common brewing techniques include boiling ground coffee in water, steeping ground coffee in cold water, and pressure techniques such as espresso that operate at pressures as high as 14 times atmospheric pressure at sea level and at sub-boiling temperatures. It is conventionally understood that brewing at close to boiling temperatures or for too long of a period will brew a coffee with an undesirable burnt or cooked flavor, and is considered over-extracted. Due to the significant variations in cultivated coffees, roasted coffee beans, and brewing techniques, there is a considerable range in coffee quality and flavor made from combinations of each of these factors.

SUMMARY

Accordingly, a system and method for brewing coffee to produce elevated levels of niacinamide is disclosed. One embodiment comprises providing a dark roasted coffee, brewing the coffee at pressures above atmospheric pressure in water consistently heated above boiling temperature, and producing a brewed coffee with elevated levels of niacinamide. Another embodiment comprises a system with a boiler with a heating element, a heat exchanger extending into the boiler, the heat exchanger having an injector with at least one lateral opening to inject water laterally into the heat exchanger, to produce pressurized water above boiling temperature to brew ground coffee at temperatures above boiling to produce a coffee with elevated levels of niacinamide. Another embodiment comprises a system with a boiler having a heating element, a heat exchanger extending into the boiler, the heat exchanger having an injector with at least one lateral opening to inject water laterally into the heat exchanger, and thermally insulated lid, wherein the system can produce pressurized water above boiling temperature to brew ground coffee at temperatures above boiling to produce a coffee with elevated levels of niacinamide.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table illustrating chemical results of brewing light and dark roasted coffees over a range of brewing temperatures.

DETAILED DESCRIPTION

Embodiments described herein create chemically different results than conventional coffee brewing. One chemical process with a significantly different result than standard brewing is higher levels of niacinamide in darker roasted coffee beans that are then brewed at significantly elevated temperatures over conventional brewing in a temperature range that was previously considered to create over-extraction in coffee. However, the embodiment apparatuses and processes described herein create other chemical changes in brewed coffee in comparison to standard brewing techniques, some of which will be illustrated in the analytical results sheet in FIG. 3 and are not restricted to increased niacinamide extraction or development. For purposes of illustration, the following detailed description will focus on the Trigonelline, nicotonic acid and niacinamide (FIG. 4A in particular) aspects of the embodiments described herein, however, other significant chemical changes occur according to these techniques as can be seen from the chart in FIG. 3 as described later in this disclosure.

Figure 1A:
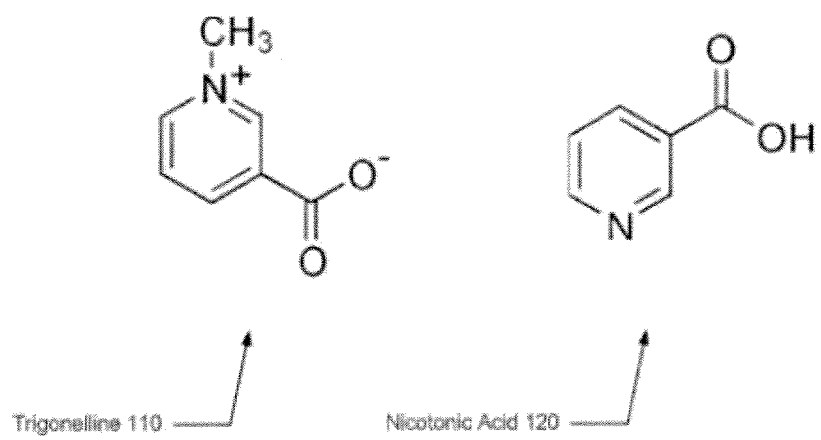
FIG. 1A shows the molecular structure of Trigonelline and nicotonic acid.

FIG. 1A shows the molecular structure of Trigonelline 110 and nicotonic acid 120. Trigonelline is a bitter alkaloid having the chemical formula $C_7H_9NO_3$, and is considered to be an important source of various chemicals compounds that contribute to coffee flavor. Trigonelline is also a naturally occurring byproduct of the metabolism of niacin (vitamin B3), also known as nicotonic acid. Sources differ on whether Trigonelline content is higher in arabica or in robusta coffee beans, but a higher percentage of sources note a slightly higher concentration of Trigonelline in arabica beans, but with either bean ranging near a 1% concentration. Trigonelline partially decomposes during coffee roasting into pyridines, nicotonic acid 120, N-methyl nicotinamide, methyl nicotinate and numerous other compounds.

Figure 2:
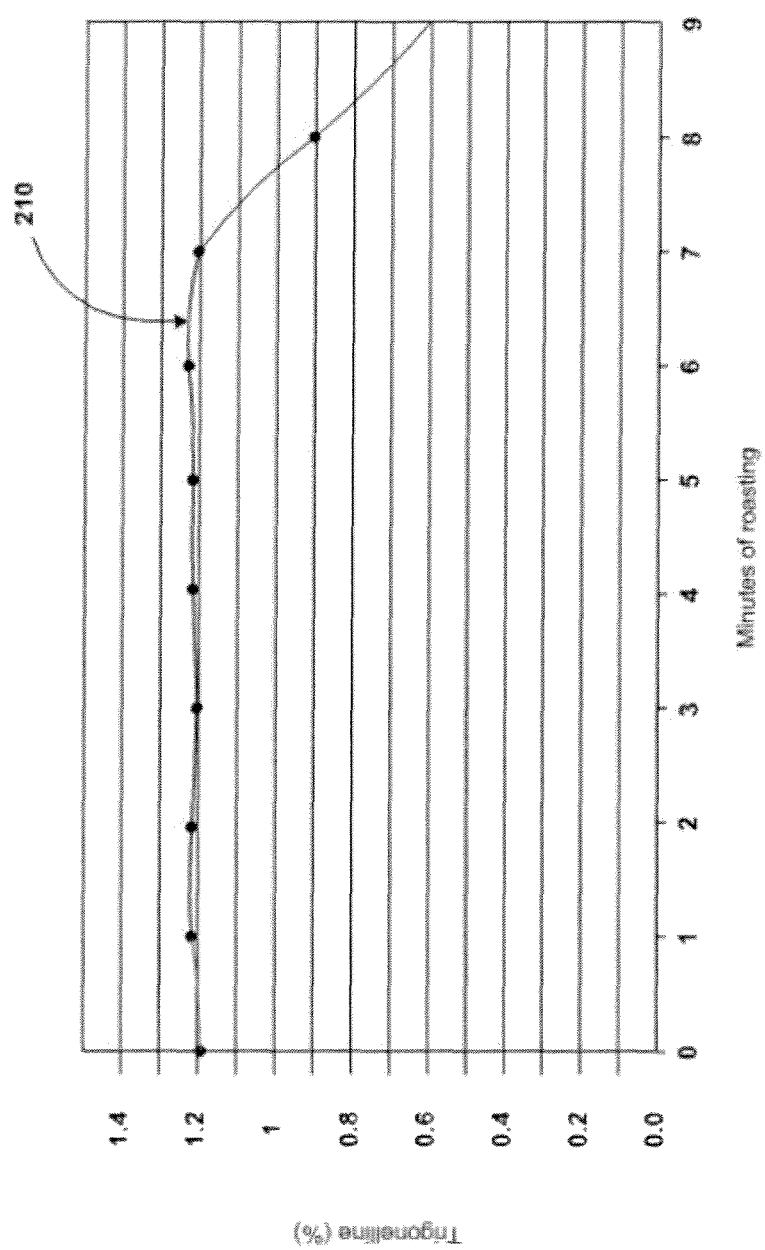
FIG. 2 is a graph illustrating Trigonelline degradation over coffee bean roasting.

Trigonelline decomposes considerably more the darker a coffee is roasted. For example, a light roast may decompose Trigonelline by 50%, while in a dark roast it may almost totally decompose. While nicotonic acid constitutes only 1-2% of the degraded Trigonelline, this results in a meaningful concentration of vitamin B3. A considerable portion of Trigonelline is decomposed into pyridine, and conventional roasting degrades Trigonelline to around 50-80% of its initial concentration. Pyridines often impart a roasty aroma in brewed coffee. FIG. 2 is a graph illustrating Trigonelline degradation over coffee bean roasting. As can be seen from the graph, after a roasting duration Trigonelline decomposes fairly quickly. Additionally, this decomposition coincides with a similar change in the roasted coffee color according to traditional coffee roasting grades as illustrated in table 1. Table 1 includes two industry standard scales to judge the degree of roasting in coffee, wherein the measurements at the bottom of Table 1 are for darker roasts.

TABLE 1

| SCAA Roast description | PROBAT Colorette 3A |
|---|---|
| Very light | 140 |
| Light | 120 |
| Moderately light | 110 |
| Light medium | 95 |
| Medium | 80 |
| Moderately dark | 70 |
| Dark | 55 |
| Very dark | 45 |

Referring to FIG. 2, at around 7 minutes of roasting time Trigonelline decomposition increases significantly. Between 6 and 9 minutes of this same roasting process the coffee will change from beyond very light at a Colorette 3A rating well above 160 to a medium roast with a Colorette 3A rating around 80. In this way, a significant change in roasted coffee color ratings coincides with the significant decomposition of Trigonelline. Studies have shown that roasting temperatures may have a more significant contribution to Trigonelline decomposition than roasting duration, for this reason the examples disclosed herein with reference to the attached figures are based on the degree of roasting measurements of Table 1. It should be noted that there are slight variations in coffee roasting scales between whole coffee beans and ground coffee as the outer portions of the bean are likely to roast more than the bean insides.

Referring back to FIG. 1A, nicotinic acid 120 (vitamin B3, niacin), is a chemically significant product of Trigonelline decomposition. Nicotinic acid 120 is produced by demethylation of Trigonelline and nicotonic acid formation becomes significant at temperatures above 320 F, and at 446 F Trigonelline is nearly 85% decomposed. In some roasting conditions niacin levels can increase concentration by an order of magnitude. Coffee has been documented as an ample source of niacin providing 10-40 mg of vitamin B3 per 100 g of coffee.

Figure 1B:
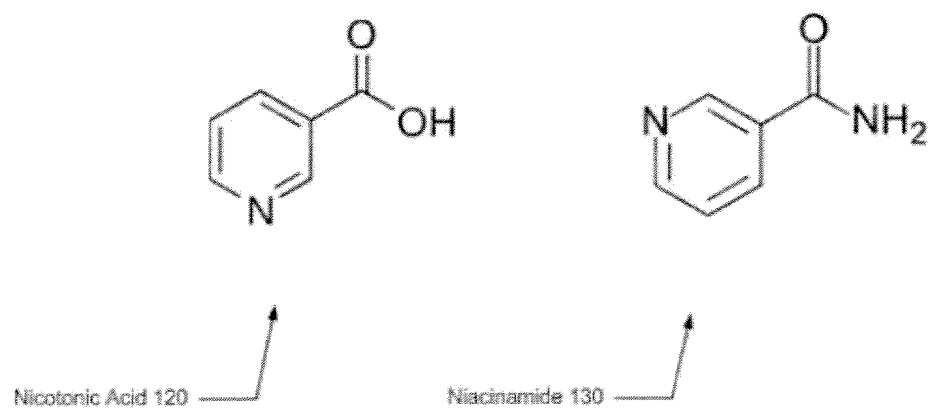
FIG. 1B shows the molecular structure of nicotonic acid and niacinamide.

Referring now to FIG. 1B, the molecular structure of nicotonic acid and niacinamide are shown. As referenced herein, Trigonelline decomposes in part into nicotonic acid in increasing amounts the darker a coffee is roasted. Niacinamide, also called Nicotinamide, is an amide of nicotonic acid but with slightly different pharmacologic and less toxic effects than nicotonic acid. Detailed vitamin and health differences between niacinamide and nicotonic acid are not discussed in this disclosure, however, with reference to FIG. 3 various concentrations of nicotonic acid and niacinamide are discussed as a result of embodiments described herein.

FIG. 3 is a table illustrating chemical results of brewing light and dark roasted coffees over a range of brewing temperatures. In FIG. 3, the lighter roasted coffee in lot number 501 and 502 were determined to have a 50 SCAA measurement (see Table 1) when ground, while the darker roast was determined to have a 35 SCAA measurement when ground. All measurements of chemical concentrations are listed in terms of milligrams per ounce of coffee (mg/oz). The second row down the table in FIG. 3 includes sample names consisting of different coffee samples with a range of equivalent shots of espresso and brewing time. Lot numbers 102, 201, and 301 were brewed at 208 F, lot numbers 202 and 302 where brewed at 214 F, lot numbers 203 and 303 were brewed at 218 F, lot numbers 401, 402 and 501 where brewed at 220 F and lot number 502 was brewed around 205 F. Lot numbers 601 and 602 are darker roasted coffees that were brewed at 224 F with brewing durations of 19 seconds and 28 seconds, respectively. Additionally, sample names beginning with a 2 signify the equivalent of a double shot of espresso having approximately 13-17 grams of ground coffee, while lot numbers beginning with a 3 signify the equivalent of a triple shot of espresso having approximately 18-27 grams of ground coffee.

As can be seen from the chart, there is a nonlinear relationship between niacin and niacinamide concentrations over a range of brewing temperatures. As would be expected, higher dosages of espresso result in generally higher concentrations of caffeine and niacinamide. This is particularly interesting in that the general trend of niacin levels does not follow the same curve for concentrations when measured in mg/oz. We now focus on niacinamide levels and note that one result of brewing methods disclosed herein is an increasing niacinamide concentration at higher brewing temperatures and using darker roasted coffee beans.

Figure 4A:
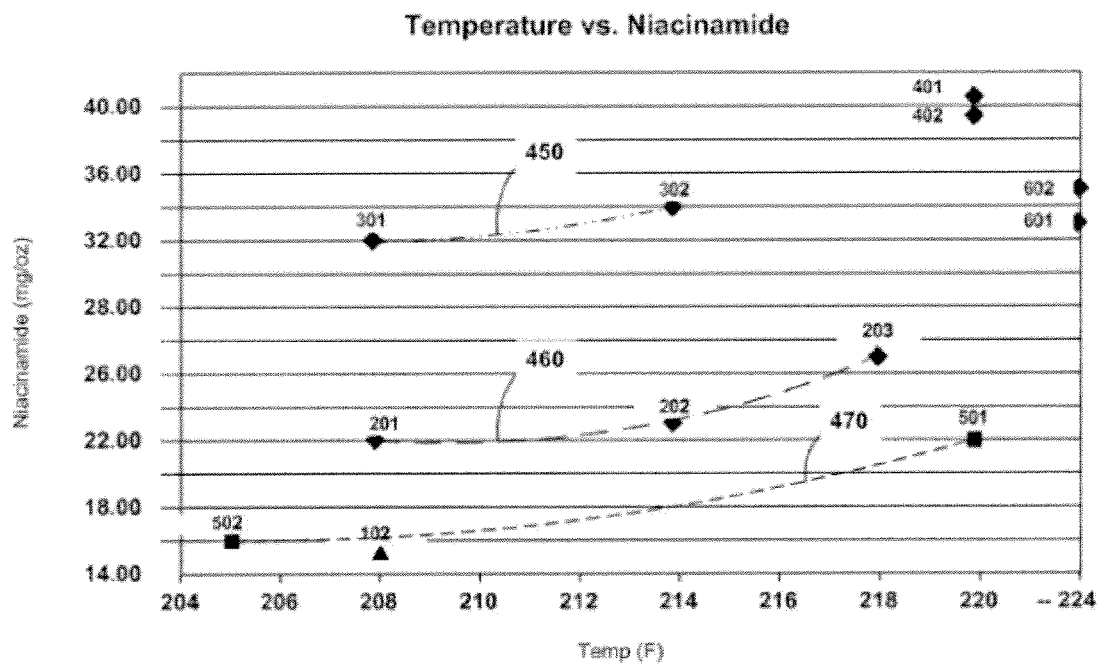
FIG. 4A is a graph illustrating niacinamide concentration levels in light and dark roasted coffees brewed over a range of brewing temperatures.

FIG. 4A is a graph illustrating niacinamide concentration in light and dark roasted coffees brewed over a range of brewing temperatures. The reference numerals of data points in FIGS. 4A and 4B relate to the lot numbers in FIG. 3. Additionally, line 450 relates to samples having roughly the equivalent of a triple shot of dark roasted espresso, line 460 relates to samples having roughly the equivalent of a double shot of dark roasted espresso, and line 470 relates to samples having roughly the equivalent of a double shot of lighter roasted espresso.

Accordingly, the temperature range around 216 to 222 shows an increase in niacinamide concentration in the resulting coffee, where above and below this range niacinamide concentration is typically lower. And a subset of this range that has the highest range of niacinamide concentration is from 218 F to 221 F. Experts in the coffee brewing industry currently lists 205 F as the upper limit while some vendors have brewed slightly higher than this temperature. Some coffee vendors have brewed coffee around 208 F, however brewing espresso at temperatures approaching boiling has been widely accepted as undesirable.

Figure 4B:
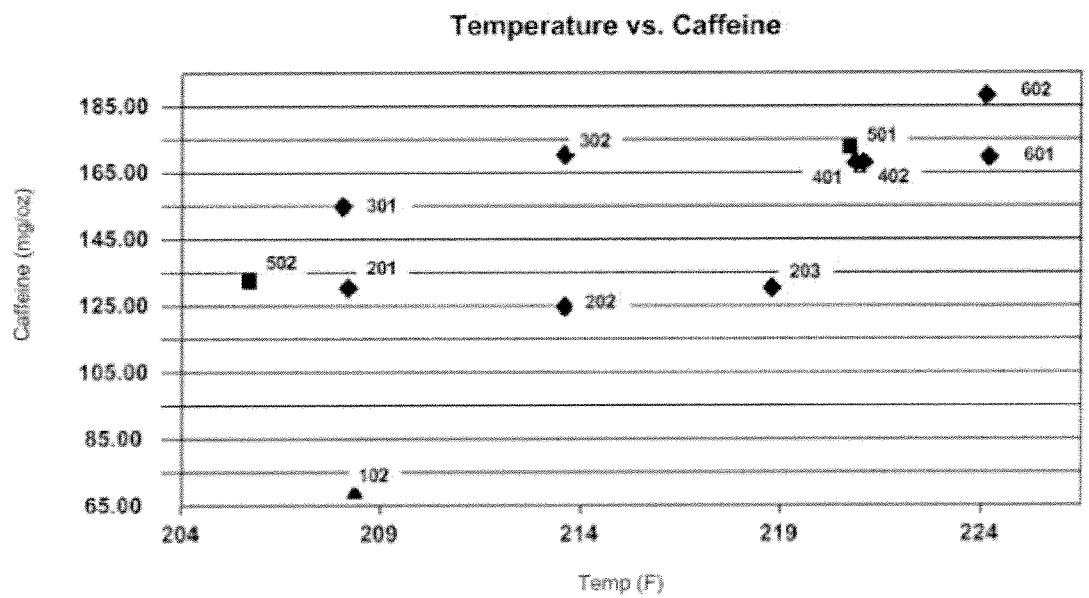
FIG. 4B is a graph illustrating measured caffeine amounts in light and dark roasted coffee brewed over a range of temperatures.

FIG. 4B is a graph illustrating measured caffeine amounts in coffee brewed over a range of brewing temperatures. Additionally, as can be seen in FIG. 4B, dark roasted coffee may still undergo a relatively high amount of caffeine extraction when the coffee is brewed at elevated temperatures. Conventional wisdom in the coffee industry is that dark roasted espresso has less caffeine, but the measurements shown in FIG. 4B and in the chart in FIG. 3 suggest that dark roasted coffee has additional caffeine in it that was extracted in comparison to conventional brewing temperature ranges. Additionally, these charts illustrate that at elevated temperatures that caffeine extraction may be more independent of brewing time, or contact time of the coffee grounds to the elevated temperature water.

As can be seen in FIG. 4A at 224 F, lot numbers 601 and 602 start having lower concentrations of niacinamide than similar samples from 216-222 F. Caffeine extraction continues to increase at these temperatures (224 F), however, the resulting coffee at this range begins to taste over-extracted. Therefore, the range from 216-222 F coincides with higher niacinamide concentrations as well as high caffeine extraction, but without the resulting coffee having an over-extracted flavor. Additionally, caffeine extraction for dark roasted coffee in the 216-222 F temperature range may be approximately double the extraction that may be achieved at standard brewing temperatures around 205 F.

Therefore, an example embodiment comprises a method of brewing coffee by providing a dark roasted coffee, brewing the coffee at above atmospheric pressure in water heated above boiling temperature, and producing a brewed coffee with at least 24 milligrams of niacinamide per ounce of brewed coffee. In some embodiments, higher concentrations of niacinamide result when the coffee is brewed using water between 216 and 222 degrees Fahrenheit. Furthermore, in some embodiments particularly higher concentrations of niacinamide result when the dark roasted coffee has a Specialty Coffee Association of America (SCAA) roast designation of dark or of very dark, or when the dark roasted coffee has a PROBAT Colorette rating of 55 or darker. Some embodiments may utilize roasts that are not as dark as the levels on the SCAA and PROBAT scales listed here, but may also in degree have higher concentrations niacinamide.

Figure 5:
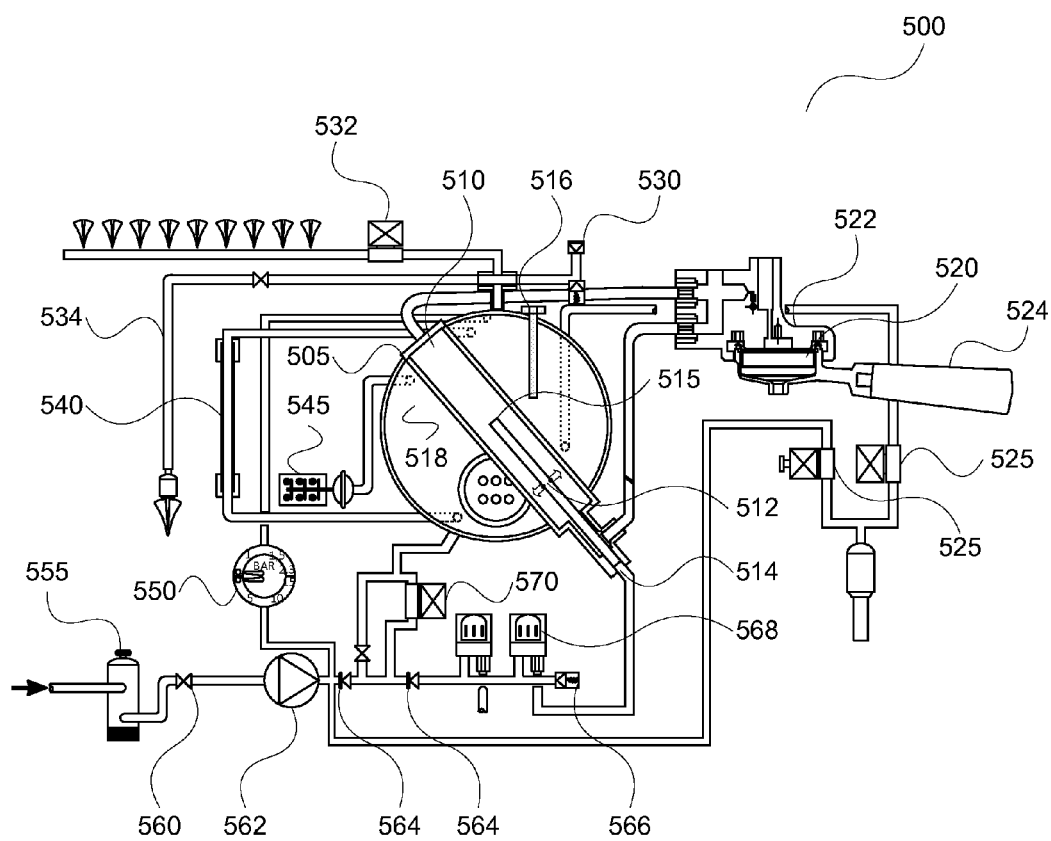
FIG. 5 illustrates a brewing boiler with an injector that laterally injects water into a heat exchanger to efficiently heat water to brew coffee over a range of brewing temperatures.

FIG. 5 illustrates a brewing boiler to efficiently heat water to brew coffee over an elevated temperature. One example embodiment comprises a system 500 with a boiler 505 including a boiler heating element 518, the boiler 505 to contain pressurized water at pressures higher than one atmosphere to allow the boiler heating element 518 to heat the water above atmospheric boiling temperature; a heat exchanger 510 extending into the boiler 505, the heat exchanger 510 having an injector 514 with at least one lateral opening 512 to inject water laterally into the heat exchanger 510; a group head 522 coupled with the heat exchanger 510 and to receive pressurized water above atmospheric boiling temperature; and a group handle 524 including a container portion 520 to house ground coffee, the container portion 520 to receive pressurized water above atmospheric boiling temperature from the group head 522 and to brew the ground coffee at temperatures above atmospheric boiling temperature to produce a coffee with elevated levels of niacinamide per ounce of coffee in relation to coffee brewed at conventional temperatures less than at atmospheric boiling temperature.

In some embodiments, the injector 514 has a plurality of lateral openings to inject water laterally into the heat exchanger. In some embodiments, the injector 514 also has a capped end 515 to force more water out of the lateral openings. Embodiments may utilize one or more lateral openings. For example, two opposing lateral openings may be placed a sufficient distance from the end of the injector to improve thermal exchange from the boiler to the water in the heat exchanger. Some embodiments may use a single lateral opening, or may use one or more lateral openings of specific shapes to either increase water flow out of the injector, or to shape or channel the water flow out of the injector laterally and therefore increase the thermal exchange of water from the boiler 505 to the water in the heat exchanger 510.

The lateral openings of the heat exchanger injector 514 provides more control to maintain a stable brewing temperature. Additionally, the lateral openings of injector 514 allow more heat to be transferred in the heat exchanger 510 as the input water is not being injected toward an outlet of the heat exchanger 510, this in turn allows system 500 to achieve an elevated temperature while still staying at a lower boiler pressure than a conventional injector allows.

Prior art heat exchanger injectors are configured to inject water straight into a heat exchanger, whereby the cold water entering the heat exchange may disrupt the thermal stability of the system. For example, in some prior art systems heat exchanger injectors may inject water directly at an upper outlet so that the water is not sufficiently heated in the heat exchanger before being used to brew coffee. With embodiments using injector 514, the cold water is more evenly dispersed in the heat exchanger and is converted to a higher temperature before it reaches an exit tube of the heat exchanger 510.

In some embodiments, injector 514 may be placed between 25% and 55% of the distance up the heat exchanger 510 for better thermal transfer. In some embodiments, the plurality of lateral openings may be placed along the length of injector 514 with some of the lateral openings outside of the 25% to 55% distance up the heat exchanger 510. For example, a majority of the plurality of openings may be within the range while other lateral openings are outside the range. Additionally, in some embodiments, some of the plurality of lateral openings may have a diameter of at least 1.2 mm In some embodiments, the plurality of lateral openings may comprise openings of different sizes. Additionally, the openings of different sizes may be placed on the injector 514 in a manner to improve efficiency of thermal transfer within the heat exchanger 510.

In some embodiments, the system may brew coffee with water that is between 216 and 222 degrees Fahrenheit. Additionally, some embodiments may use water between 216 and 222 degrees when the water reaches the ground coffee. Furthermore, in some embodiments particularly higher concentrations of niacinamide result when the dark roasted coffee has a SCAA roast designation of dark or of very dark, or when the dark roasted coffee has a PROBAT Colorette rating of 55 or darker. Some embodiments may utilize roasts that are not as dark as the levels on the SCAA and PROBAT scales listed here, but may also in degree have higher concentrations niacinamide.

In some embodiments the boiler 505 can heat water to 222 degrees Fahrenheit at a boiler pressure at 1.8 bar or lower. In this way, the higher temperature can be achieved with a boiler consisting of copper or other similar suitable metals that are less well suited for higher pressures. This is in no way limiting to the metals or materials that may be used however, and any other suitable high-pressure capable metals or materials may be used since it is operating at a lower pressure range than would be achieved with conventional boilers reaching these temperatures.

Figure 6:
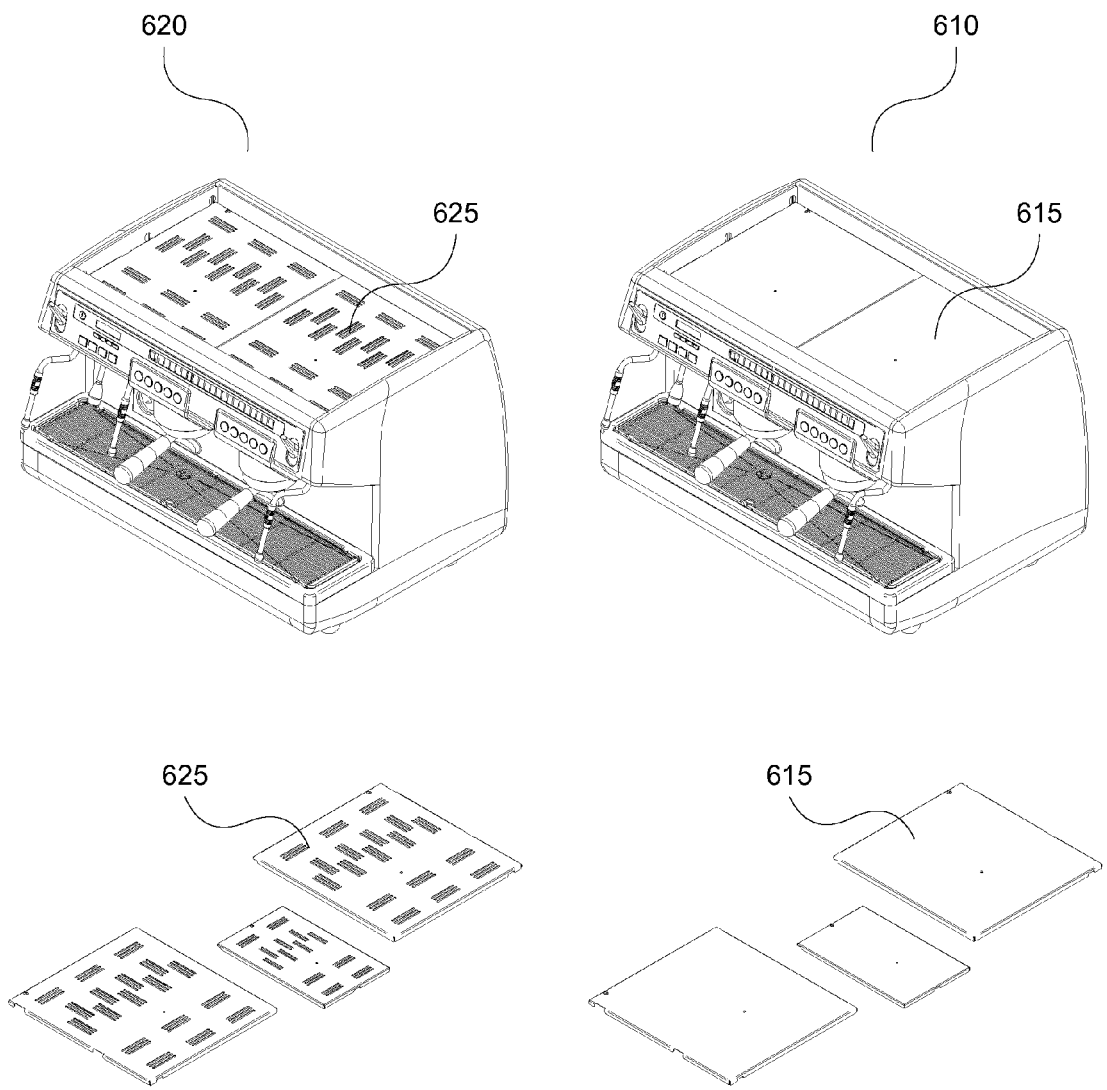
FIG. 6 illustrates a brewing apparatus with a thermally insulated lid.

FIG. 6 illustrates a brewing apparatus 610 with a thermally insulated lid. For example, in some embodiments a brewing system 610 may further comprise closed top panels 615 to retain heat within the system to more efficiently heat the water above atmospheric boiling temperature. An alternative embodiment 620 may comprise adjustable vents (not shown) in the top panels 625 to provide closed top panels to retain heat within the system to more efficiently heat the water above atmospheric boiling temperature and also to provide opened vents to allow brewing at conventional brewing temperatures below atmospheric boiling temperature.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for brewing coffee, the system comprising:
   a boiler including a boiler heating element, the boiler to contain pressurized water at pressures higher than one atmosphere to allow the boiler heating element to heat the water above atmospheric boiling temperature;
   a heat exchanger extending into the boiler, the heat exchanger having an injector with a plurality of lateral openings to inject water laterally into the heat exchanger in a different direction than the outlet of the heat exchanger, the injector further having a capped end to direct the injected water through the lateral openings, wherein the majority of the lateral openings are placed along the injector between 25-55% of the distance up the heat exchanger and some of the plurality of lateral openings have a diameter of at least 1.2 millimeters;
   a group head coupled with the heat exchanger and to receive pressurized water above boiling temperature; and
   a group handle including a container portion to house ground coffee, the container portion to receive pressurized water above boiling temperature from the group head and to brew the ground coffee at temperatures above boiling.

2. The system of claim 1, wherein the water is between 216 and 222 degrees Fahrenheit.

3. The system of claim 2, wherein the water is between 216 and 222 degrees when it reaches the ground coffee.

4. The system of claim 1, wherein the ground coffee is dark roasted coffee with a Specialty Coffee Association of America roast designation of dark or of very dark.

5. The system of claim 1, wherein the ground coffee is dark roasted coffee with a Probat Colorette rating of 55 or darker.

6. The system of claim 1, further comprising closed top panels to retain heat within the system to more efficiently heat the water above boiling temperature.

7. The system of claim 6, wherein the boiler can heat the water to 222 degrees Fahrenheit at a boiler pressure at 1.8 bar or lower.

8. The system of claim 1, further comprising adjustable vents in the top panels to provide closed top panels to retain heat within the system to more efficiently heat the water above boiling temperature and also to provide opened vents to allow brewing below a boiling temperature.

* * * * *